US006203643B1

(12) United States Patent
Gaunt et al.

(10) Patent No.: US 6,203,643 B1
(45) Date of Patent: *Mar. 20, 2001

(54) METHOD OF PLACING MARKINGS ON A POLYMER PLASTIC GRAVE MARKER

(75) Inventors: Ian Andrew Gaunt, P.O. Box 3211, Spruce Grove, Alberta (CA), T7X 3A5; Hung Bui Quach, Edmonton (CA)

(73) Assignee: Ian Andrew Gaunt, Spruce Grove (CA)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/936,824

(22) Filed: Sep. 25, 1997

Related U.S. Application Data

(63) Continuation-in-part of application No. 08/729,843, filed on Oct. 15, 1996, now abandoned.

(51) Int. Cl.[7] ...................... B23B 31/00

(52) U.S. Cl. ...................... 156/153; 156/257; 40/124.5; 52/103; 264/138

(58) Field of Search ...................... 156/153, 154, 156/257; 264/138; 52/103; 40/124.5

(56) References Cited

U.S. PATENT DOCUMENTS 3,310,918 3/1967 Taylor, Jr. .
3,852,145 12/1974 Kloweit .
3,938,286 2/1976 Mochinski .
5,047,187 9/1991 Banus .
5,198,168 3/1993 Thurston .

FOREIGN PATENT DOCUMENTS 892684 2/1972 (CA) .
2244482 * 3/1974 (DE) .
23 56 378 5/1975 (DE) .
30 24 388 1/1982 (DE) .
44 09 959 A1 11/1995 (DE) .
77 03711 9/1978 (FR) .

OTHER PUBLICATIONS

Lee, Henry, et al, "Epoxy Resins Their Applications and Technology," McGraw–Hill Book Co., Jul. 31, 1957, pp. 219, 220.*

* cited by examiner

*Primary Examiner*—Jeff H. Aftergut
(74) *Attorney, Agent, or Firm*—Davis & Bujold, P.L.L.C.

(57) ABSTRACT

A method of placing markings on a polymer plastic grave marker. Firstly, providing a polymer plastic grave marker of a known polymer composition. The polymer plastic grave marker is of a first color. Secondly, removing material from a surface of the polymer plastic grave marker to form hollow markings. Thirdly, providing liquid polymer that is capable of bonding with the known polymer composition, in one or more other colors. Fourthly, filling the hollow markings in the polymer plastic grave marker with the liquid polymer. The liquid polymer bonds with the known polymer composition, thereby providing integral colored markings. The polymers used are chosen to have the same coefficient of thermal expansion and moisture absorption and are preferably the same polymer.

4 Claims, 2 Drawing Sheets

METHOD OF PLACING MARKINGS ON A POLYMER PLASTIC GRAVE MARKER

This application is a continuation-in-part of U.S. Ser. No. 08/729,843 filed Oct. 15, 1996, now abandoned.

FIELD OF THE INVENTION

The present invention relates to a polymer plastic grave marker and a method of placing markings, such as letters and decorative designs, on the same.

BACKGROUND OF THE INVENTION

In German patent application No. 23 56 378, filed in 1973, Helmut Stroede disclosed a form of polymer plastic grave marker. In his application, Stroede did not address how one would place lettering or decorative designs onto the polymer plastic grave marker. In French application No. 77 03711, filed in 1977, James Girault proposed a grave marker of a synthetic resin with one transparent surface in which was embedded decorative designs. More recently, German application No. 44 09 959, filed in 1994, for a hollow polymer plastic grave marker, Annerose and Dieter Augustin made provision for a metal plate to fit into recesses in the grave marker and be secured in position by screws.

Polymer plastic grave markers have some obvious advantages over gravestones in terms of their light weight, resistance to dirt, resistance to lichen, and low cost when compared to granite. However, in order for polymer plastic grave markers to increase in popularity, a method must be devised to place letters and decorative designs on the grave markers in a fashion that is sufficiently versatile to accommodate different styles of marking, aesthetically appealing, and durable.

SUMMARY OF THE INVENTION

What is required is an improved method of placing letters and decorative designs on a polymer plastic grave marker.

According to one aspect of the present invention there is provided a method of placing markings on a polymer plastic grave marker, comprising the steps of: a) providing a grave marker of a first polymer composition; b) removing material from a surface of the polymer plastic grave marker to form hollow markings; c) providing second polymer composition, having a thermal expansion coefficient and moisture absorption coefficient substantially identical to that of said first polymer composition, in fluid form and of a contrasting appearance when cured to said first polymer composition, said second polymer composition being capable of bonding with the first polymer composition; and d) filling the hollow markings in the grave marker with said liquid second polymer composition, the liquid polymer composition then being cured to bond with the first polymer composition, thereby providing integral markings of the contrasting appearance.

Also according to the invention there is provided a polymer plastic grave marker, comprising: a body of a first polymer composition; and integrally formed polymer plastic markings of a second polymer composition having a contrasting appearance to the first polymer composition, the first and second polymer compositions having a thermal expansion coefficient and a moisture absorption coefficient which are substantially identical.

Apart from a difference in coloration intended for visual contrast, the polymer plastic markings are indistinguishable from the balance of the polymer plastic grave marker. They are not subject to shrinkage over time. They will not fall out upon impact. They are integrally bonded and form part of the polymer plastic grave marker.

BRIEF DESCRIPTION OF THE DRAWINGS

These and other features of the invention will become more apparent from the following description in which reference is made to the appended drawings wherein.

DETAILED DESCRIPTION OF THE PREFERRED EMBODIMENT

The preferred method of placing markings on a polymer plastic grave marker will now be described with reference to FIGS. 1–4.

Figure 1:
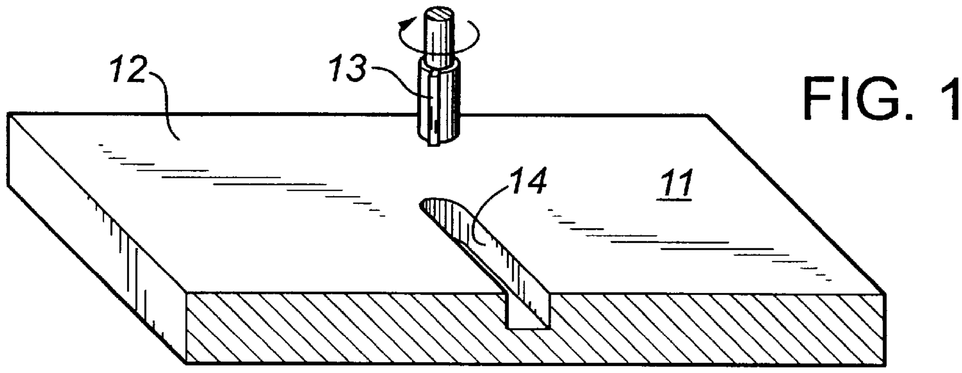
FIG. 1 is a perspective view illustrating a step of removing material from a surface of a polymer plastic grave marker to form hollow markings in accordance with the teachings of the present invention.

Referring to FIG. 1, the first step involves providing a polymer plastic grave marker 12 of a first polymer composition. The polymer plastic grave marker is of a first appearance. In the prototype, the polymer composition was a polymer matrix consisting of polyester and acrylic sold under the trademark CAVINA by Cavina Products Inc. of Edmonton, Alberta, Canada. The appearance selected was the color black.

The second step involves removing material from a surface 11 of polymer plastic grave marker 12 to form hollow markings 14. The material was removed using a router blade 13. There are, of course, many alternative ways that hollow markings 14 can be formed, such as cutting, etching, scratching, carving, stamping, sandblasting, burning, and the like.

Figure 2:
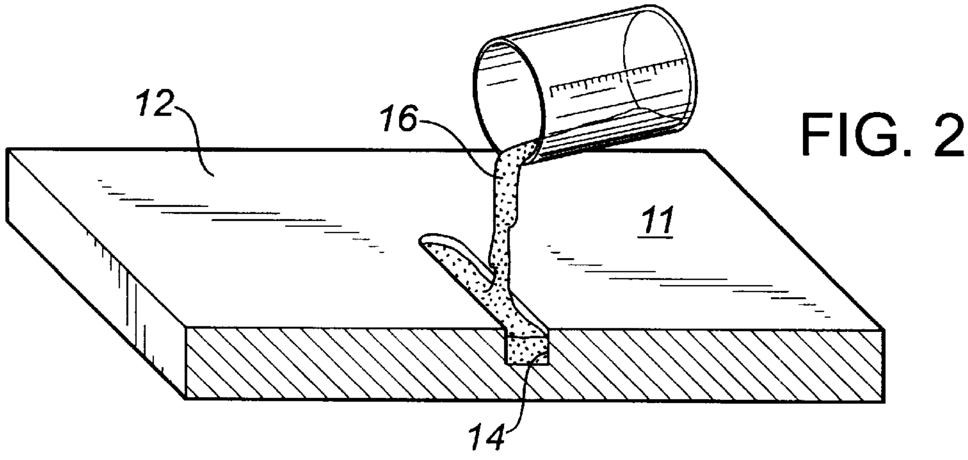
FIG. 2 is a perspective view illustrating a step of filling the hollow markings in the polymer plastic grave marker with a liquid polymer.

Referring to FIG. 2, the third step involves providing a second polymer composition 16 in liquid form of at least one other appearance that is capable of bonding with the first polymer composition. In the prototype, the liquid polymer used was CAVINA. To demonstrate the flexibility of the method, a number of appearances in the form of colors were used, including red, green and white.

The fourth step involves filling hollow markings 14 in polymer plastic grave marker 12 with the liquid polymer 16. During curing, a chemical reaction occurs which bonds the second polymer composition 16 with the first polymer composition of the polymer plastic grave marker 12. In this prototype, this created a polymer plastic grave marker 12 with integral colored markings.

Figure 3:
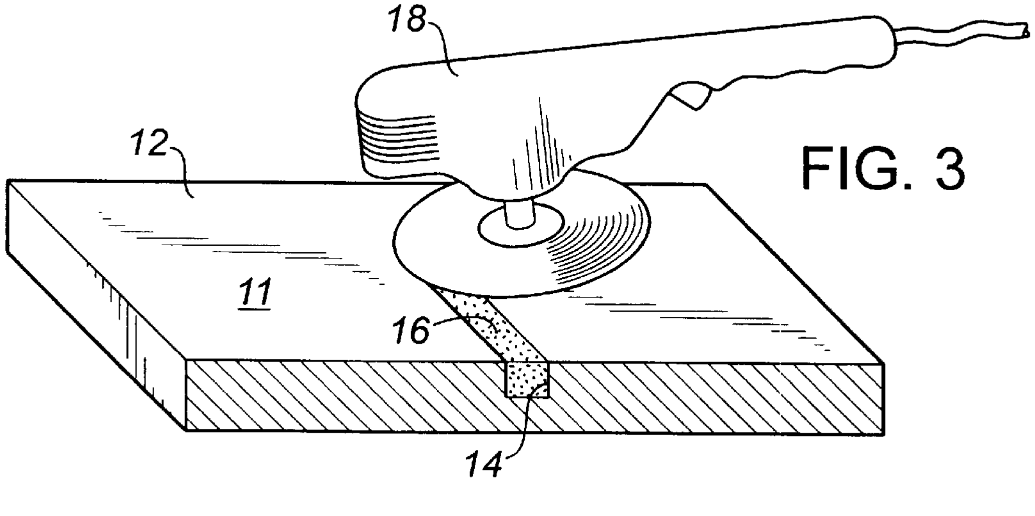
FIG. 3 is a perspective view illustrating a step of sanding the polymer plastic grave marker to remove ridges and other surface imperfections.

Referring to FIG. 3, the fifth step involves sanding polymer plastic grave marker 12 to remove any ridges and surface imperfections. The sanding was performed with a sander 18.

Figure 4:
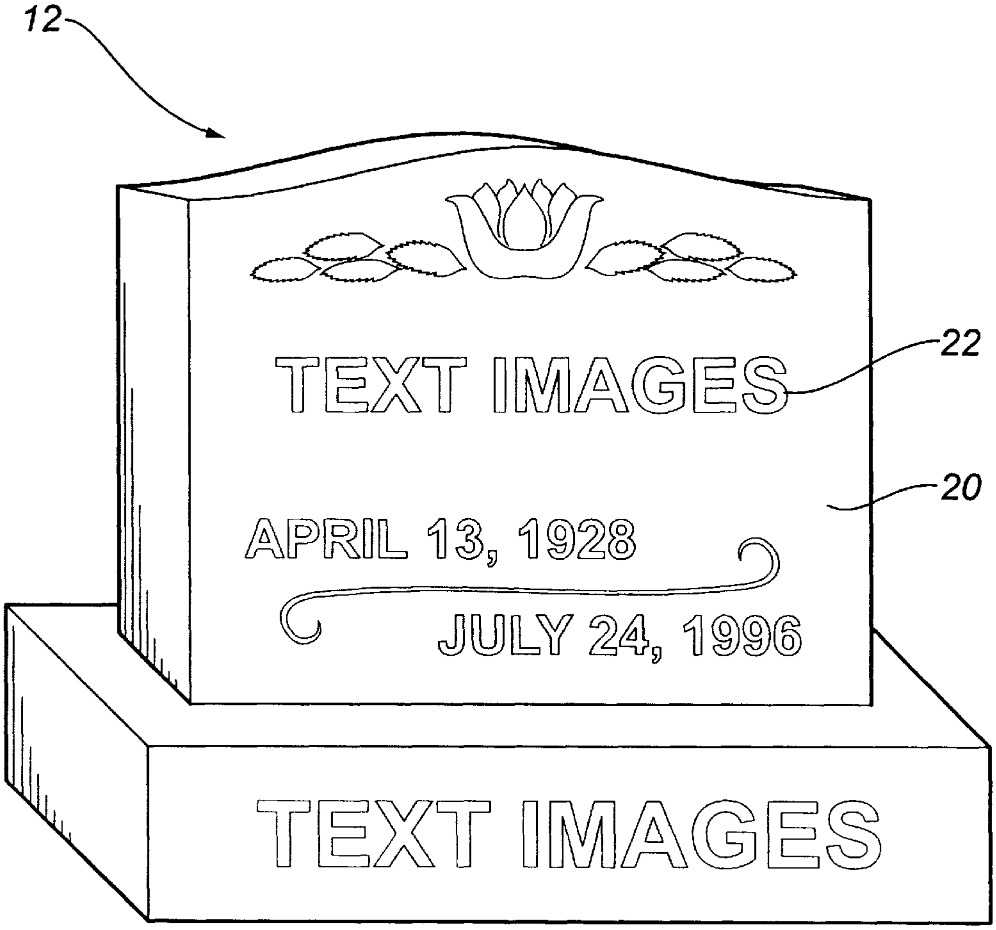
FIG. 4 is a perspective view of a grave marker that has integral colored markings in accordance with the teachings of the present invention.

Referring to FIG. 4, following the teachings of the above described reference results in polymer plastic grave marker 12 having a polymer plastic body 20 of a first appearance (i.e. color) and integrally formed second polymer plastic markings 22 of a different appearance (i.e. color). Markings 22 can be in any number of colors.

Preferably the polymer plastic grave marker 12 and the polymer 16 are one in the same material, e.g. a polymer matrix consisting of polyester and acrylic sold under the trademark CAVINA by Cavina Products Inc. of Edmonton, Alberta, Canada and in any event are materials having substantially identical coefficients of thermal expansion and moisture absorption whereby as one material expands or contracts due to environmental changes so changes the other.

What is claimed is:

1. A method of placing markings on a polymer grave marker, comprising the steps of:

a) providing a grave marker of a first cured polymer composition;

b) removing material from a surface of the polymer plastic grave marker to form hollow markings;

c) providing a second polymer composition, having a thermal expansion coefficient and a moisture absorption coefficient substantially identical to that of said first polymer composition, in fluid form and of a contrasting appearance, when cured to said first polymer composition, said second polymer composition being capable of forming an integral structure with the first polymer composition; and d) filling the hollow markings in the grave marker with said fluid form of second polymer composition, the second polymer composition then being cured to integrate with the first polymer composition, thereby providing an integral composite structure of the first polymer composition and the second polymer composition of contrasting appearance;

wherein the first polymer composition and the second polymer composition are a polymer matrix of polyester and acrylic.

2. A method according to claim 1, wherein the first and second polymer compositions are of an identical structure when cured.

3. A method according to claim 1, including sanding the polymer plastic grave marker to remove any ridges and surface imperfections left by the cured liquid polymer.

4. A method of making a polymeric plastic grave marker, comprising:

a) providing a body of a first composition consisting of a matrix of polyester and acrylic;

b) forming hollowed out marking spaces in the body;

c) structurally integrally forming polymer plastic markings of a second polymer composition identical with said composition, though having a contrasting appearance to the first polymer composition, by adding a second composition in fluid form to fill the marking spaces, and d) curing the second composition to form an integral structure with the body, to form an integral grave marker structure in which the thermal expansion coefficients and a moisture absorption coefficients of the body and markings are identical in order to produce a marker in which environmental exposure will not loosen the markings from the body.

* * * * *